Figures 1, 6:
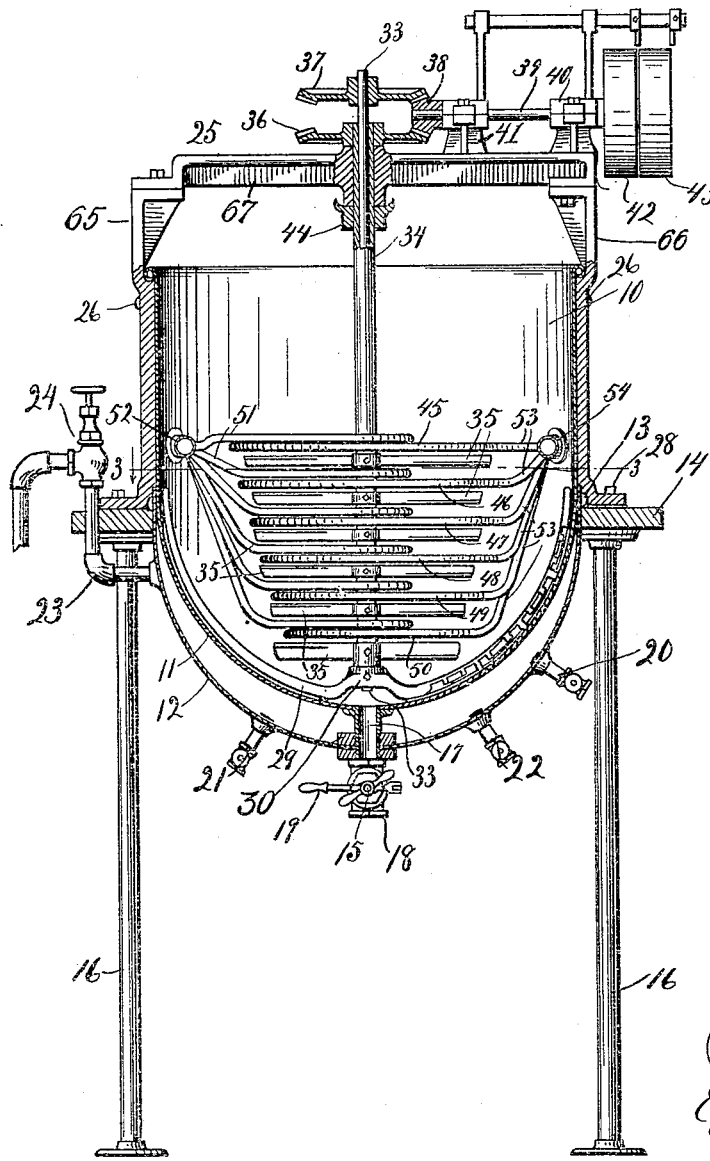

C. F. MOLANDER.
COOKING VESSEL.
APPLICATION FILED NOV. 4, 1907.

960,105.

Patented May 31, 1910.

2 SHEETS—SHEET 1.

Witnesses:
W. H. Cotton
Charles B. Gillson

Inventor:
Charles F. Molander
By Louis K. Gillson
Att'y.

C. F. MOLANDER.
COOKING VESSEL.
APPLICATION FILED NOV. 4, 1907.
960,105.
Patented May 31, 1910.
2 SHEETS—SHEET 2.
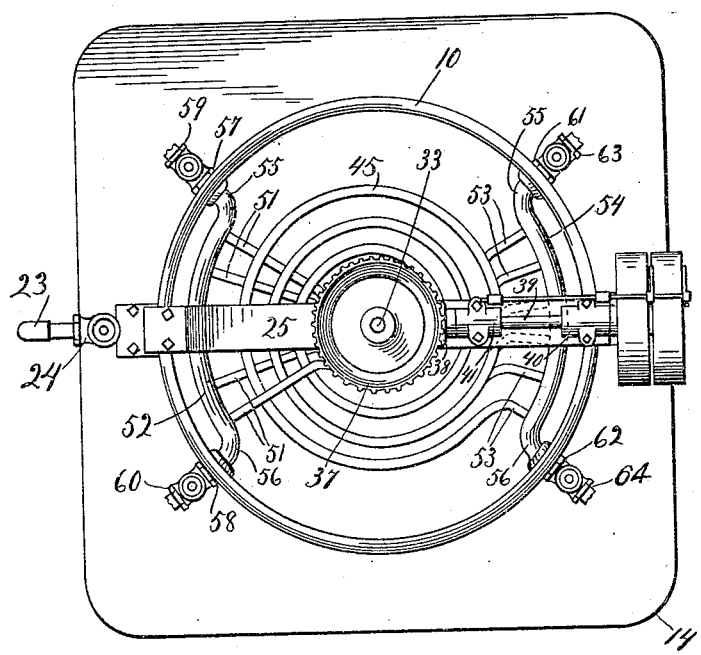
Fig. 2.
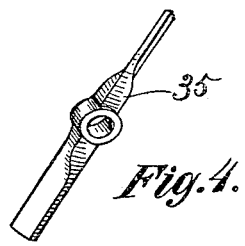
Fig. 4.
Fig. 5.
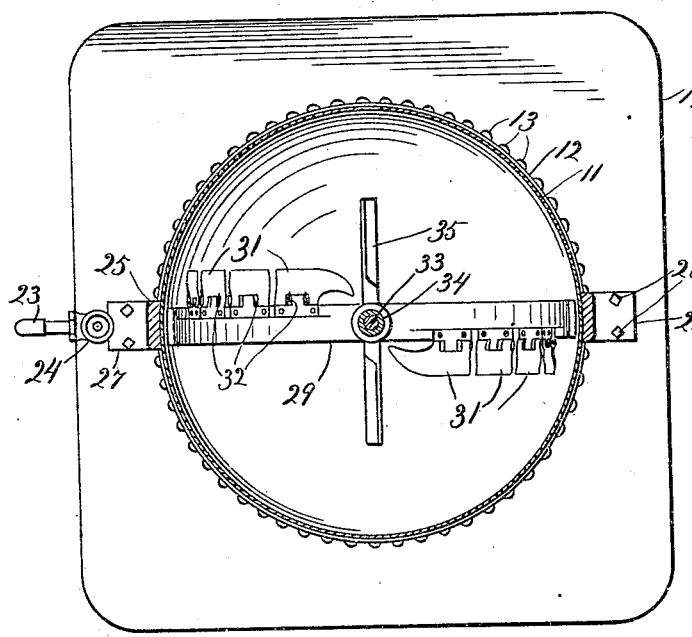
Fig. 3.
Witnesses:
W. H. Cotton
Charles B. Gillson.
Inventor:
Charles F. Molander.
By Louis F. Gillson
Att'y

UNITED STATES PATENT OFFICE.

CHARLES F. MOLANDER, OF CHICAGO, ILLINOIS, ASSIGNOR TO CHARLES HOLMBERG & COMPANY, OF CHICAGO, ILLINOIS, A PARTNERSHIP.

COOKING VESSEL.

960,105.  Specification of Letters Patent.  Patented May 31, 1910.

Application filed November 4, 1907. Serial No. 400,657.

*To all whom it may concern:*

Be it known that I, CHARLES F. MOLANDER, a citizen of the United States, and resident of the city of Chicago, county of Cook, and State of Illinois, have invented certain new and useful Improvements in Cooking Vessels, of which the following is a specification and which are illustrated in the accompanying drawings, forming a part thereof.

The invention relates to cooking vessels wherein provision is made for conducting a heating fluid through the contents of the vessel, and more particularly to such vessels as are also provided with a mechanical stirring appliance.

In the treatment of certain materials, as in the preparation of candy, it is desirable to subject the material simultaneously to a uniform application of heat and to a vigorous stirring throughout its mass.

The object of the invention is to provide means for subjecting a fluid substance to this treatment and to that end the invention contemplates a container for fluid having a stirring appliance and pipe coils for receiving a heating medium laid within the container in such manner as to effect a uniform distribution of heat throughout the mass of material contained therein without interfering with the operation of the stirring appliance.

In the accompanying drawings: Figure 1 is a central vertical section of apparatus embodying the invention; Fig. 2 is a plan view of the same; Fig. 3 is a plan sectional view taken on the lines 3—3 of Fig. 1, some of the parts being omitted; Figs. 4 and 5 relate to details of the construction and Fig. 6 shows in perspective a detail of a certain pipe coil employed in the apparatus.

The apparatus illustrated in the drawings is of a form which may be conveniently employed successively for the melting, mixing, cooking, and cooling of the material employed for candy cream centers. As shown, this apparatus comprises an open container designated 10, which is preferably formed of sheet metal and has throughout its lower portion a double wall 11, 12 constituting a jacket for receiving a heating or a cooling fluid. The wall sections 11, 12 are permanently united by a plurality of rivets 13, which extend around the vessel preferably about midway of its height and the projecting heads of these rivets provide a convenient means for supporting the vessel upon a suitable base ring as 14. Preferably the base ring 14 is carried by a plurality of standards 16 at a sufficient height to admit of apparatus (not shown), into which the contents of the vessel 10 may be discharged, being located beneath the vessel. For discharging the contents of the vessel 10 a drain pipe 17 which leads through the jacket provided by the double walls 11, 12 is provided at its base and carries at its lower end a valve 18 preferably of a form whereby a wide opening of the drain may be rapidly effected and as shown comprising a slide 15 adapted to be operated by a lever 19. Valve controlled connections 20 and 21 are provided in the outer wall 12 of the jacket for the admission and exhaust of steam, and as shown, a similar connection 22 is also provided in the wall section 12 of the jacket for the admission thereto of cooling water. For the escape of the cooling water from the jacket an overflow 23 is preferably provided and this, as shown, leads out of the jacket adjacent the upper margins thereof in order that air may not become entrapped within the jacket above the overflow during the circulation of cooling water. The overflow 23 preferably leads upwardly a short distance from the point of its connection with the outer wall section 12, as most clearly shown in Fig. 1 of the drawings, and is controlled by a valve 24.

Preferably a stirring appliance is provided for agitating the contents of the vessel 10, and as shown, this stirring appliance comprises a two part dasher 35, 29, the parts of the dasher being adapted for rotation in opposite directions and both being carried by a frame, generally designated by the numeral 25. This frame 25 preferably comprises uprights 65, 66, which rise from the base ring 14 to which they are bolted, as at 28, and a cross-piece 67 carried by the uprights 65, 66, and extending over the mouth of the vessel 10. For preventing the vessel 10 from being displaced upon its seat on the base ring 14, the side walls of the vessel are preferably bolted to the uprights 65, 66 of the frame 25, as indicated at 26, Fig. 1.

One of the parts of the dasher provided for agitating the contents of the vessel preferably takes the form of a blade 29 curved to substantially conform in shape to the walls of the vessel and being offset as indicated at 30 to avoid obstructing the entrance of the drain pipe 17. Preferably the dasher blade 29 carries a plurality of scrapers 31 adapted to yieldingly engage the walls of the vessel in advance of the blade. To that end each of the scrapers is hinged to the forward edge of the blade and is yieldingly advanced upon the wall of the vessel by a spring 32. As shown the blade 29 is mounted at the foot of a central shaft 33 which extends upwardly through the vessel 10. The blades comprising the second part 35 of the dasher are preferably mounted at intervals throughout the fluid receiving part of the vessel 10 on a tubular shaft or sleeve 34, which surrounds the shaft 33 for substantially its entire length.

The sleeve 34 is journaled, adjacent its upper end, in the frame 25 and the shaft 33 turns within the sleeve. Above the frame 25 the sleeve 34 and the shaft 33 are provided with oppositely facing beveled gears 36, 37 adapted for engaging, at opposite sides of its center, a driving gear pinion 38 mounted upon the inner end of a driving shaft 39, which, as shown, is journaled in standards 40, 41 carried by the frame 25 and projects over the side of the vessel 10 where it is provided with tight and loose belt pulleys 42, 43. The hub of the gear 36 engages the upper face of the frame 25 for supporting the parts of the dasher within the vessel, and a collar 44 mounted on the sleeve 34 immediately below the frame 25 serves for preventing an upward displacement of the dasher.

For the uniform distribution of the heat throughout the mass of material contained within the vessel 10 pipe coils for conveying a heating or a cooling fluid are laid within the vessel. In order that these coils may not interfere with the operation of the dasher they are preferably structurally independent, the several coils 45, 46, 47, 48, 49 and 50 being, as shown, each of continuous spiral form and being arranged in horizontal planes not traversed by the dasher blades 35. One of these coils, as 46, is illustrated in detail in Fig. 6 of the drawings. Preferably one end, as that end 51 of each of the pipe coils which forms the interior part of the spiral, leads to a header 52 for feeding the coils. This header, as shown, is common to all of the coils and is located at one side of the vessel adjacent a wall thereof and above that part of the wall traversed by the dasher blade 29, the ends 51 of those pipe coils, as 48, 49 and 50, which are below the ends of the dasher blade 29 being led upwardly from the pipe coils adjacent the walls of the vessel but separated therefrom a sufficient distance to be cleared by the blade.

To permit of a continuous circulation of fluid through the pipe coils, as 45, 46, 47, 48, 49 and 50 that end as 53 of the pipe coils remote from the end 51 leading to the header 52 leads to a common exhaust passage 54 located within the vessel above the path of the dasher blade 29, and preferably adjacent the wall of the vessel, remote from the header 52. Preferably the header 52 and the exhaust passage 54 take the form of pipe of sufficient capacity to properly supply and drain all of the pipe coils 45, 46, 47, 48, 49, 50 and each is horizontally arranged within the vessel adjacent the wall thereof and has both of its ends turned outwardly, as indicated at 55 and 56 and projecting through the vessel walls. The projecting ends as 57, 58, of the header 52 are each provided with a valve controlled connection as 59, 60, one of such connections being adapted for the introduction of a heating fluid, as steam, and the other for a cooling medium, as cold water. Preferably the projecting ends as 61, 62 of the drain or exhaust passage 54 are also each provided with a valve controlled connection as 63, 64, these being respectively for carrying away the steam and cooling-water admitted to the pipe coils through the header 52.

In use the material to be treated will be delivered to the vessel 10 commonly in the form of soft lumps or a thick pasty mass filling the vessel to about the depth of the uppermost of the dasher blades 35. This material will be reduced to a fluid condition by the application of heat, steam for that purpose being introduced in the jacket by way of the connection 20 and in the pipe coils within the vessel by way of the connection 59 and header 52. The material may be then vigorously whipped or beaten by use of the dasher, 29, 35, the blades 35 and 29 being rotated in opposite directions by the gear pinion 38.

The application of heat and stirring may be continued for as long as may be necessary for the purpose of bringing the material to the desired condition. During this part of the process the exhaust passages 63 and 21 will preferably be opened to permit of a circulation of steam through the pipe coils within the vessel and through the jacket respectively. When it is desired to discontinue the application of heat the steam inlet and exhaust passages 20, 59, and 21, 63 will be closed and the contents of the vessel may be immediately cooled by the use of cooling water in the jacket and pipe coils within the vessel as 45, 46, 47, 48, 49, and 50. To this end the connections 60 and 64 will be opened for the admission of cooling water to the header 52 and for the escape of the same from the common exhaust passage 54 respectively, and the connections 22, 23 will be opened to permit a circulation of cooling water through the jacket inclosed by the wall sections 11, 12 of the vessel. The contents of the vessel may be instantly withdrawn by way of the drain pipe 17 by the use of the valve 18.

I claim as my invention—

1. In combination, a fluid receiving vessel, a dasher rotatable about the vertical axis of the vessel and comprising a horizontal stirring blade movable within the body of the vessel and a scraper movable over the floor and side wall of the vessel beyond the end of the stirring blade, a radiator coil located within the vessel below the stirring blade, and terminal connections for the coil leading through the vessel in the space intervening between the path of the end of the stirring blade and the path of the scraper.

2. In combination, a fluid receiving vessel, a dasher rotatable about the vertical axis of the vessel and comprising a plurality of horizontal stirring blades arranged at different levels within the body of the vessel and a scraper movable over the floor and side wall of the vessel beyond the ends of the stirring blades, a plurality of horizontal radiator coils located within the vessel between the stirring blades, and terminal connections for each of the coils leading through the vessel in the space intervening between the paths of the ends of the stirring blades and the path of the scraper.

3. In combination, a fluid receiving vessel, and a radiator within the vessel comprising a pair of horizontal header pipes located adjacent the walls of the vessel near the top of its fluid receiving portion both ends of each of the header pipes being extended laterally through the wall of the vessel, a plurality of horizontal spiral pipe coils arranged at different levels within the fluid receiving portion of the vessel, and connection within the vessel between each end of all the coils and one of the header pipes, the vertically extending portions of such connections being adjacent but not in contact with the side walls of the vessel, whereby the space between the coils is unobstructed for the operation of horizontally movable stirring blades and the wall of the vessel below the header pipes is unobstructed for the operation of a scraper.

CHARLES F. MOLANDER.

Witnesses:
CHARLES B. GILLSON,
E. M. KLATCHER.